United States Patent [19]

Sklokin et al.

[11] Patent Number: 5,050,997

[45] Date of Patent: Sep. 24, 1991

[54] MIXER-SETTLER FOR LIQUID-LIQUID EXTRACTION

[76] Inventors: Leonid I. Sklokin, ulitsa Kozlova, 5, kv. 38; Vladimir E. Leif, ulitsa Zinovieva, 8, kv. 34; Jury M. Sednev, ulitsa Dzerzhinskogo, 45, kv. 82; Sofya M. Masloboeva, ulitsa Stroitelei, 41, kv. 41; Vladimir P. Kovalevsky, all of Murmanskaya oblast, Apatity; Genrikh V. Korpusov, Leninsky prospekt, 69, korpus 3, kv. 398, Moscow; Vladimir Y. Stepanov, ulitsa Gorkogo, 6, kv. 8; Boris M. Bobylkov, ulitsa Chkalova, 20, kv. 62, both of Estonskaya SSR, Sillamyae; Vladimir T. Kalinnikov, ulitsa Zinovieva, 10, kv. 65; Boris M. Stefanovich, ulitsa Festilvanaya, 10, kv. 63, both of Murmanskaya oblast, Apatity, all of U.S.S.R.

[21] Appl. No.: 415,366

[22] PCT Filed: Dec. 23, 1987

[86] PCT No.: PCT/SU87/00149

§ 371 Date: Aug. 21, 1989

§ 102(e) Date: Aug. 21, 1989

[87] PCT Pub. No.: WO89/05684

PCT Pub. Date: Jun. 29, 1989

[51] Int. Cl.$^5$ ............................................. B01F 7/18
[52] U.S. Cl. .................................... 366/292; 366/169; 210/320; 210/520
[58] Field of Search ............... 210/320, 520, 522, 521; 366/279, 290, 292, 168, 169

[56] References Cited

U.S. PATENT DOCUMENTS

| | | | |
|---|---|---|---|
| 3,460,678 | 8/1969 | Convolios | 210/520 |
| 3,933,654 | 1/1976 | Middlebeek | 210/521 |
| 3,997,444 | 12/1976 | McGivern | 210/521 X |
| 4,045,344 | 8/1977 | Yokata | 210/521 X |
| 4,067,813 | 1/1978 | Pielkenrood | 210/521 X |
| 4,806,237 | 2/1989 | Ewald, Jr. | 210/320 X |

FOREIGN PATENT DOCUMENTS

| | | |
|---|---|---|
| 168641 | 4/1965 | U.S.S.R. |
| 273157 | 8/1970 | U.S.S.R. |
| 644499 | 1/1979 | U.S.S.R. |
| 940789 | 7/1982 | U.S.S.R. |
| 963145 | 9/1983 | U.S.S.R. |

OTHER PUBLICATIONS

Handbook of Solvent Extraction—p. 280.

*Primary Examiner*—Frankie L. Stinson

[57] ABSTRACT

A mixer-settler for liquid-liquid extraction has a casing having a first partition arranged lengthwise of its longitudinal axis above a discharge weir. A stirring device is connected to at least an arrangement for feeding one of the phases, and is fashioned at least as one hollow element arranged perpendicularly to the longitudinal axis of the casing. Walls of the hollow element have holes outlets of which face the first partition. The first partition has a mechanism for controlling the height of the layer of mixture (M) of phases in the mixing zone arranged in this partition at a location longitudinally remote from the arrangement for feeding the phases (L,S). A settling zone has a second transporting means secured on the casing and positioned after the discharge weir downstream of the flow of light phase (L).

4 Claims, 4 Drawing Sheets

MIXER-SETTLER FOR LIQUID-LIQUID EXTRACTION

BACKGROUND OF THE INVENTION

1. Field of the Invention

This invention generally relates to devices for carrying out the processes of countercurrent extraction, and more particularly concerns a mixer-settler for liquid-liquid extraction.

The invention can find application in the chemical, petrochemical and metallurgical fields of industry for carrying out the processes of liquid-liquid extraction.

2. Description of the Related Art

There is known a mixer-settler for liquid-liquid extraction (cf., "Handbook of Extraction", Edited by The C. Lo, Malcolm H. I. Baird, Carl Hanson, John Wiley & Sons, New York, 1983, page 280), in which each extraction chamber comprises a casing having the interior thereof divided by a vertical partition into mixing and settling zones. The vertical partition is provided with a port at the level of interface between the phases for overflow of the mixture of phases to the settling zone. The mixing zone accommodates a rotating stirrer secured to the casing, and a means for feeding the light and heavy phases. The settling zone accommodates means for removing the light and heavy phases secured to the casing.

However, a combination of the processes of stirring and transporting the phases executed by the rotating unit makes it impossible to separately effect drop size conditioning of the mixture of phases and control its volume, which results in reduced efficiency, more complicated operation of, and large production floor area occupied by this prior art apparatus.

There is also known a mixer-settler for liquid-liquid extraction (SU, A, 940, 789), in which each extraction chamber has a casing the interior of which is divided by a vertical partition into mixing and settling zones. The vertical partition has a height less than the height of the casing walls defining a gap with the base of the casing wherethrough the mixing zone communicates with the settling zone. The mixing zone accommodates a row of horizontal partitions with central holes receiving a rotatable stirring means secured to the casing, and means for feeding light and heavy fractions. These means are fashioned, respectively, as a pipe in one side wall of the casing, and a port in the other side wall of the casing. The settling zone accommodates means for evacuating the light and heavy fractions. The means for evacuating the light and heavy fractions, fashioned as a discharge weir, is made in the side wall of the casing, and has the form of a port. The means for removing the heavy phase has the form of a hydraulic seal, and is provided with a transporting means.

In this prior art extraction apparatus operations associated with mixing and conveying the phases are partially separated. The light phase flows from the settling zone to the adjacent extraction chamber by gravity, whereas the heavy phase is forcibly moved by transporting means.

The use in the known apparatus of a conventional rotatable stirrer fails to afford efficient drop size conditioning, that is to vary within a wide range the size of drops of the dispersed phase and the quantity of such drops, while at the same time ensuring a highly homogeneous composition of the mixture of phases. Another disadvantage is the lack of provision for separately conditioning the drop size in the mixture of phases in the mixing zone and its volume.

Self-overflow of the light phase between the extraction chambers, on the one hand, dictates the hydraulic dependence between the chambers, and, on the other, results in incomplete utilization of the working volume of the chambers due to the need of maintaining therein a different level, which eventually unfavourably affects controlling the composition of the mixture of phases. The aforementioned structural features of this known apparatus are not conducive to higher operation efficiency or reduced production floor area to be occupied by the apparatus.

In addition, the staggered arrangement of the mixing and settling zones in the adjacent chambers leads to expansion of the attendance area of the apparatus.

SUMMARY OF THE INVENTION

The invention is therefore directed toward the provision of a mixer-settler for liquid-liquid extraction so structurally arranged as to ensure separate conditioning of drop size and controlling the volume of the mixture of phases in the mixing zone and consequently increasing the production efficiency of the apparatus, reducing the production floor area occupied thereby, and minimizing attendance areas.

The aim of the invention are attained by a mixer-settler for liquid-liquid extraction, in which each extraction chamber has a casing accommodating a first partition dividing the interior of the casing into a mixing zone having arranged therein stirring means and means for conveying light and heavy phases attached to the casing, and a settling zone communicating with the mixing zone and accommodating means for evacuating the light phase in the form of a discharge weir attached to the casing and a means for evacuating the heavy phase including a hydraulic seal and a first transporting means communicating therewith. According to the invention, the first partition is disposed lengthwise of the longitudinal axis of the casing above the discharge weir, the stirring means having the form of at least one hollow element with walls thereof having holes outlets of which face the first partition mounted substantially perpendicularly to the longitudinal axis of the casing and connected to at least the feeding means of one of the phases, the first partition being with a means for controlling the height of the layer of a mixture of phases in the mixing zone mounted on this partition at a location longitudinally remote from the means for feeding the phases, whereas the settling zone is provided with a second transporting means secured to the casing and positioned after the discharge weir downstream of the flow of light phase.

The arrangement of the first partition lengthwise of the longitudinal axis of the casing above the discharge weir allows production of emulsion in the form of an elongated layer, rather than in the form of a column of liquid, thereby making it possible to effectively control the height of such emulsion layer and consequently the volume of the emulsion in the mixing zone. This in turn affords control of the time of contact between the phases, which is important for the process of transfer of the ingredient being extracted from one phase to another. In addition, it is possible to use a stirring or mixing device having no moving parts, improve access to the elements of such a mixing device forming the emulsion, and increase the volume of the settling zone at the same production floor area occupied by the apparatus.

The proposed arrangement of the mixing device makes it possible, through varying the flow area of holes in the hollow elements and the number of such holes, to form drops of the dispersed phase of a desired diameter and in a required quantity, in other words, to ensure drop size conditioning. The use of several hollow elements allows metering of feed of the dispersed phase to any section of the mixing zone, repetition of operations associated with dispersion and coalescence, and recirculation of the phases.

Connection of the mixing device to the means for feeding the light and/or heavy phase enables formation in the mixing zone of drops of the light or heavy phase, or a mixture of phases, i.e., to produce various types of emulsion.

Provision of the first partition with a means for controlling the height of the layer of mixed phases affords variation of the volume of emulsion, and consequently the time of contact between the phases irrespective of the operation of the mixing means.

Arrangement of the second transporting means in the settling zone prevents the hydraulic dependence of the extraction chambers, and allows separate feeding and mixing of phases in the mixing zone. This second transporting means acts to stabilize the processes of drop size conditioning and controlling the volume of the mixture of phases both in each separate chamber and in the entire apparatus.

The forced feeding of the light and heavy phases from the settling zone of this extraction chamber, when the transporting means convey the phases to the mixing zones of the adjacent chambers, rather than suck-in the phases from the adjacent chambers to the mixing zone of this chamber, is important, especially at high flow rates of the solutions being processed.

Preferably, each hollow element of the proposed mixer-settler for liquid-liquid extraction is spaced lengthwise of the longitudinal axis of the casing from the adjacent hollow element a certain distance to form in a transverse section a gap with the side wall of the casing. With respect to each two adjacent elements, such gaps rest at the opposite sides of the longitudinal axis.

The above arrangement of the hollow elements promotes a more complete mixing of the phases, affords control of the time of contact between the phases, and ensures recirculation of the phases.

Desirably, the means for controlling the height of the layer of mixture of phases in the mixing zone is fashioned as a second partition arranged across the width of the first partition to be capable of movement in the vertical plane.

Such an arrangement for controlling the height of the layer of the mixture of phases is advantageous, when the light phase dominates in the mixture of phases being fed, and more particularly, when it is necessary to intensify recirculation of the heavy phase. This is attained by lifting the second partition.

Alternatively, in the process mixer-settler for liquid-liquid extraction, the means for adjusting the height of the layer of mixture of phases in the mixing zone has the form of at least one pipe capable of movement in the vertical plane, the first partition being secured in the casing about its perimeter.

Such an embodiment of the means for controlling the height of the layer of mixture of phases is preferable, when the heavy phase dominates in the mixture of phases being fed, and also when it is necessary to envigorate recirculation of the light phase. This is attained by lowering the pipes or using pipes with a smaller inside diameter.

BRIEF DESCRIPTION OF THE DRAWINGS

Other objects and advantages of the invention will become more fully apparent from various specific embodiments thereof taken in conjunction with the accompanying drawings, in which.

DESCRIPTION OF THE PREFERRED EMBODIMENTS

Figure 1:
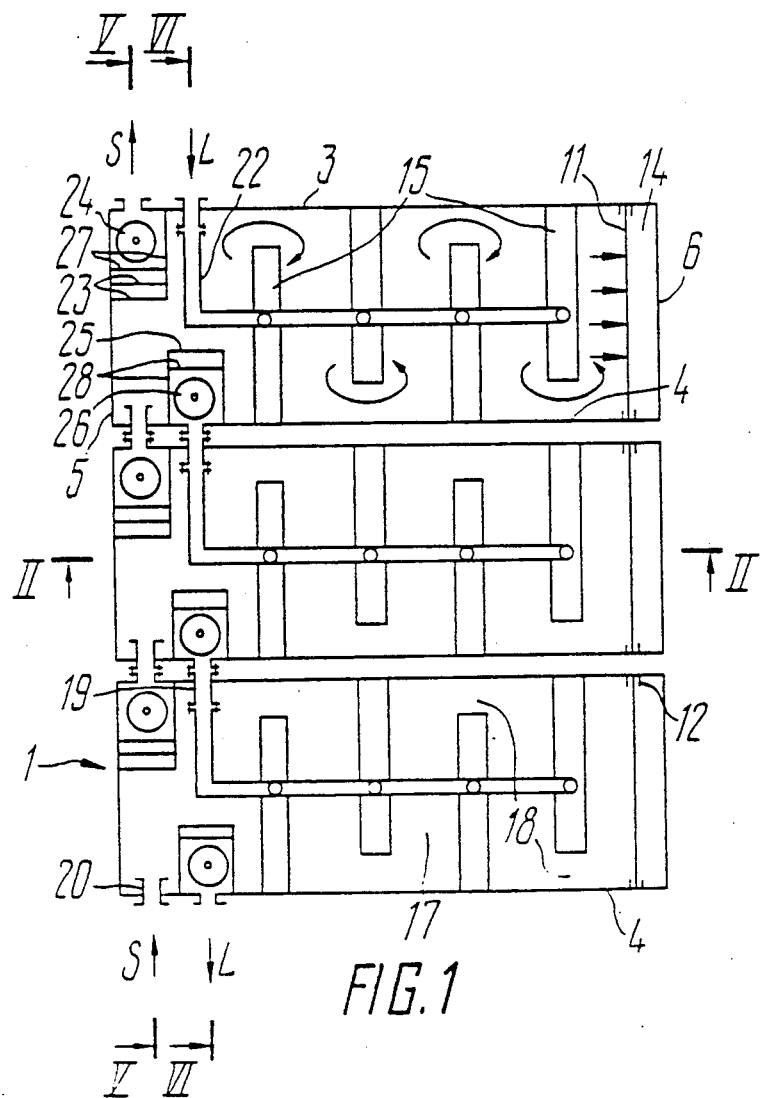
FIG. 1 is a schematic representation of a mixer-settler according to the invention, a top plan view with top wall removed.
Figure 2:
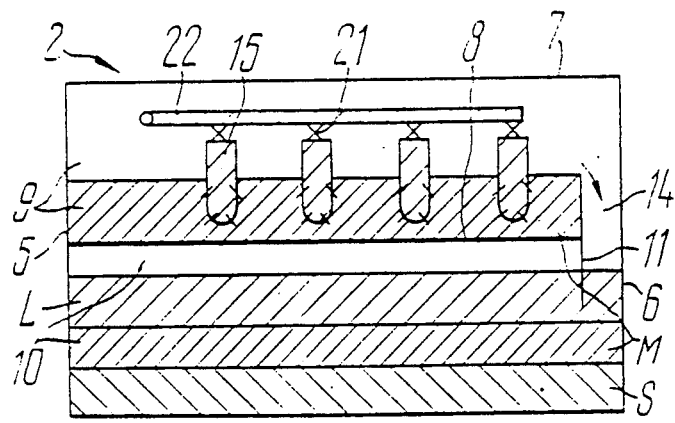
FIG. 2 is a section taken along line II—II in FIG. 1.
Figure 3:
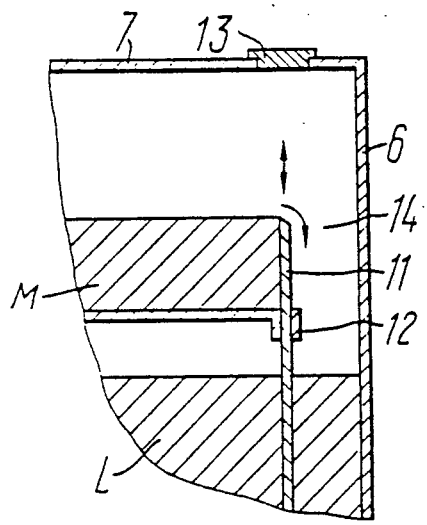
FIG. 3 is a partial section of a second partition in FIG. 1.
Figure 4:
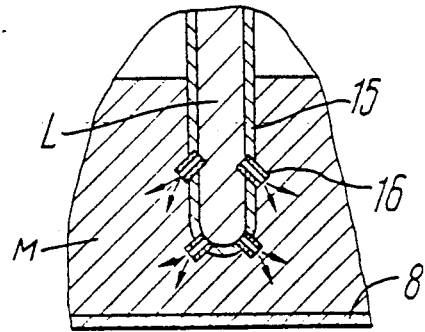
FIG. 4 is a partial section of the hollow element in FIG. 1.

A mixer-settler for liquid-liquid extraction comprises a row of extraction chambers 1 (FIG. 1). Each such chamber has a casing 2 (FIG. 2) with side walls 3,4 (FIG. 1), end walls 5, 6 and a top wall 7 (FIG. 3). Arranged inside the casing 2 (FIG. 2) lengthwise of its longitudinal axis is a first partition 8 dividing the interior of the casing 2 into a mixing zone 9 and a settling zone 10. Provided across the width of the first partition 8 is a means for controlling the level of the mixture of phases M fashioned as a second partition 11. This partition 11 is capable of moving in the vertical plane along guides 12 (FIGS. 1, 3) by means of a link member (not shown) extending through a lid 13 provided in the top wall 7 of the casing 2. The second partition 11 defines with the end wall 6 of the casing 2 a passage 14 ensuring communication of the mixing zone 9 (FIG. 2) with the settling zone 10. The mixing zone 9 accommodates a stirring means in the form of hollow elements 15 having holes 16 (FIG. 4) in walls thereof with outlets of these holes 16 facing the first partition 8. The hollow elements 15 (FIG. 1) are positioned perpendicularly to the longitudinal axis of the casing 2 so that each such hollow element 15 is spaced from the adjacent hollow element a certain distance along the longitudinal axis of the casing to form a passage for conveying the phases, and transversely to form with the side wall 3 or 4 of the casing 2 a gap 18. With respect to two adjacent elements 15 these gaps 18 are at the opposite sides of the longitudinal axis of the casing 2. Secured to the side walls 3, 4 are means for feeding light and heavy phases in the form of pipes 19 and 20, respectively. The hollow elements 15 communicate through valves 21 (FIG. 2) with a distribution pipe 22 connected to the pipe 19 (FIG. 1). The second partition 11 is positioned on the first partition 8 at a point longitudinally from the pipes 19 and 20.

Figure 5:
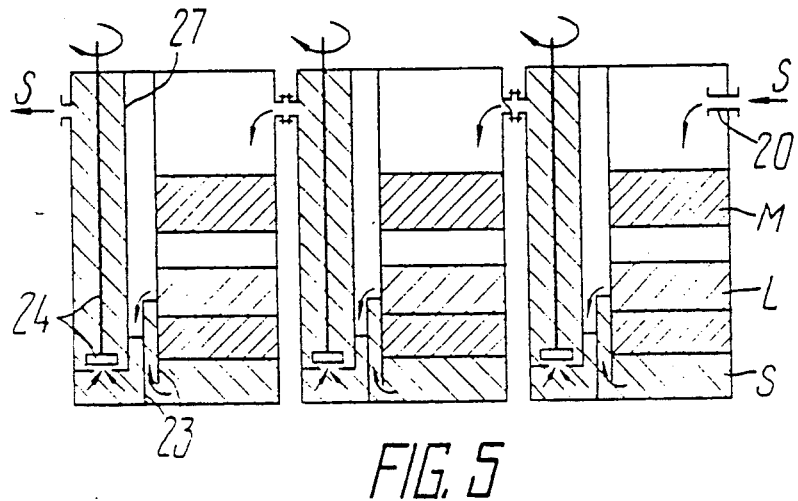
FIG. 5 is a section taken along line V—V in FIG. 1.
Figure 6:
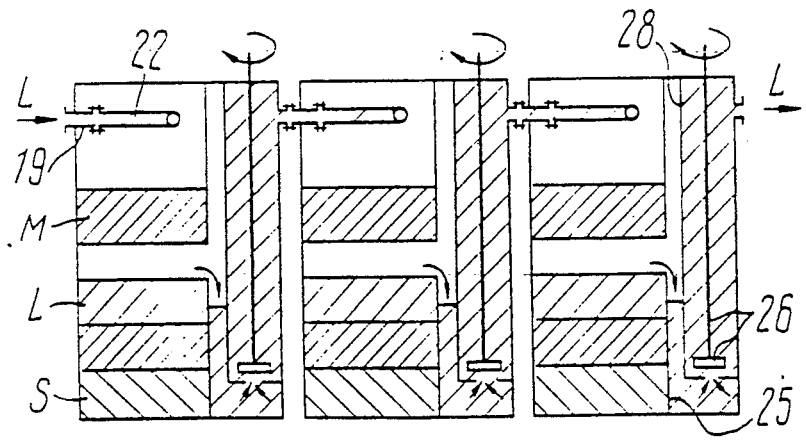
FIG. 6 is a section taken along line VI—VI in FIG. 1.

The settling zone 10 (FIG. 2) contains layers of emulsion M of the light and heavy phases L and S. This zone also has a means for evacuating the heavy phase S including a hydraulic seal 23 (FIG. 5), and a first transporting means 24 arranged after the hydraulic seal 23 downstream of the heavy phase S. The settling zone 10 (FIG. 2) is provided with a means for evacuating the light phase L in the form of a discharge weir 25 (FIG. 6) after which a second transporting means 26 is arranged downstream of the flow of the light phase L. The first transporting means 24 (FIG. 5) is disposed inside the partition 27, whereas the second transporting means 26 (FIG. 6) is disposed inside the partition 28, the two means 24 and 26 being secured on the top wall 7 (FIG. 3) of the casing 2.

The mixer-settler according to the invention operates in the following manner. The light phase L is conveyed under a pressure head through the pipe 19 (FIG. 1), distribution pipe 22, and valves 2 to the hollow elements 15. The light phase flows in the form of jets through the holes 16 in the hollow elements 154 to the mixing zone 9 of, for example, the middle extraction chamber 1.

The heavy phase S is conveyed under pressure through the pipe 20 to the mixing zone 9. It passes through the gap 18, passage 17 between the hollow elements 15, and partially under the hollow elements 15, and is agitated. Jets of the light phase L are injected to the flow of the heavy phase S, and the thus formed mixture of phases M is additionally agitated. Agitation of the flow of mixture of phases M after the last hollow element 15 downstream of the mixture of phases M is terminated, and this mixture of phases flows over the second partition 11 to the settling zone 10 (FIG. 2). Here, the flow moves in a direction counter to the flow direction in the mixing zone 9. In this course of movement of the flow in the settling zone 10 the mixture of phases is stratified into clean light phase L and clean heavy phase S. The clean heavy phase S is conveyed through the hydraulic seal 23 to the inlet of the first transporting means 24 (FIG. 5) to thereafter flow under a pressure head to the extraction chamber 1 upstream of the flow of light phase L. The clean light phase L is conveyed through the discharge weir means 25 to the inlet of the second transporting means 26 (FIG. 6), and then flows under a pressure head to the extraction chamber 1 downstream of the movement of the light phase L. In this manner a straight-flow movement of phases in each extraction chamber, and a counter-current movement in terms of the entire apparatus are ensured.

When it is necessary to increase or reduce the height of the layer of mixture of phases M in the mixing zone 9, the second partition 11 is raised or lowered, respectively. The number of hollow elements 15 is determined by the type of the phase mixture obtained. In the case of a difficulty separable mixture of phases the number of hollow elements can be fewer, whereas in the case of easily separable emulsions it can be greater. Because the light phase L is ejected from the hollow elements 15, the clearance between the base of the hollow elements 15 and first partition 8 can be minimal, whereby the drops of light phase 2 tend to ascend in the layer of the heavy phase S and envigorate mass transfer.

Figure 7:
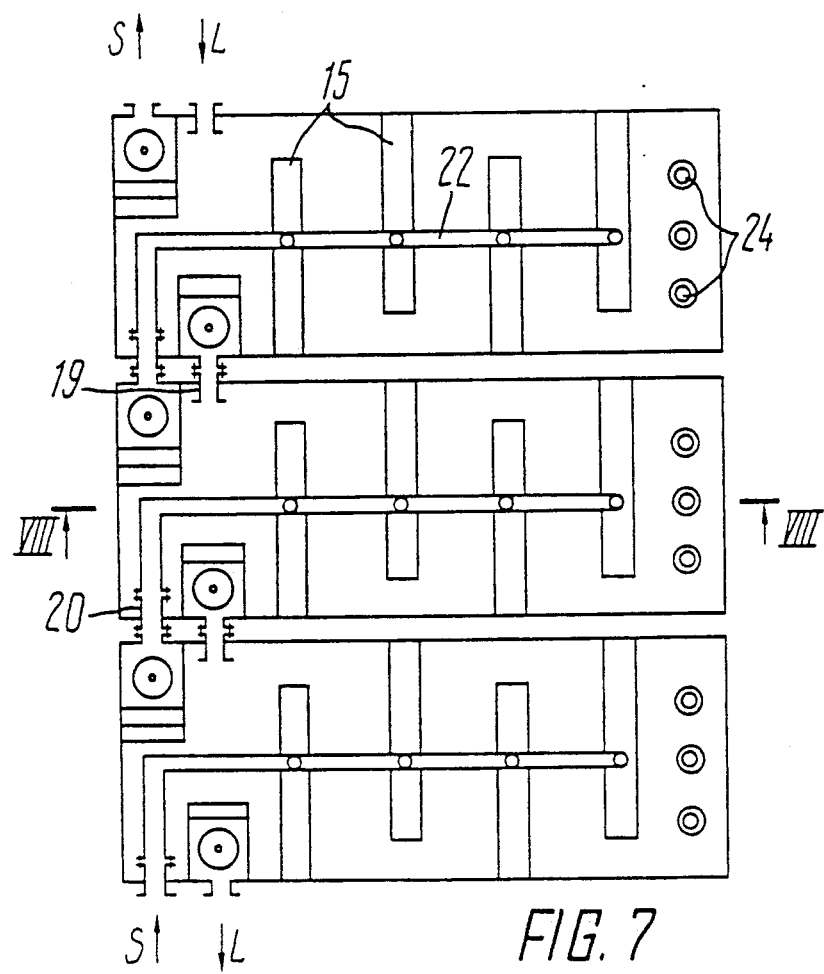
FIG. 7 is a schematic representation of a modified form of the mixer-settler according to the invention; a top plan view with a cover plate removed.

An alternative modification of the proposed mixer-settler is possible, in which the hollow elements 15 (FIGS. 7 and 8) are connected to the pipe 20 for admitting the heavy phase S. This modification is preferable, when the heavy phase is the dispersed phase.

This modified form of the proposed apparatus operates substantially similarly to what has been described heretofore. The difference resides in that the light phase L is forced by a pressure head to the mixing zone 9 through the pipe 19, whereas the heavy phase S is conveyed through the pipe 20, distribution pipe 22, and valves 21 to the hollow elements 15. From the hollow elements 15 the heavy phase S is ejected to the flow of light phase L to form the mixture of phases M. Since the heavy phase S is discharged from the hollow elements 15, the clearance between the base of the hollow elements 15 and first partition 8 can be maximal, although the upper row of holes 16 must be immersed in the mixture of phases M. Such an arrangement of the hollow elements 15 ensures the travel of drops of the heavy phase S through the entire layer of the light phase L envigorating mass transfer and promoting the desired degree of agitation of the phase mixture flow.

Figure 9:
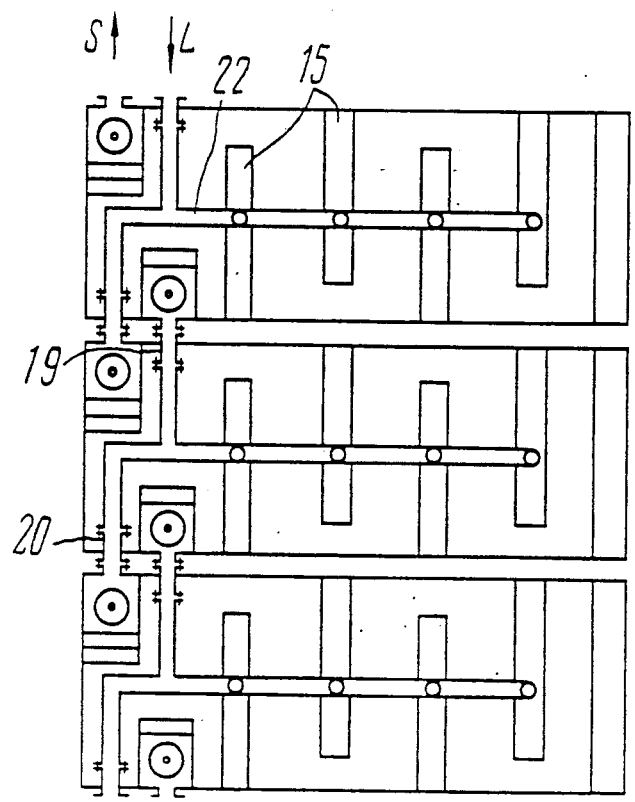
FIG. 9 is a modified form of the proposed apparatus, when the hollow elements are connected to the means for feeding the light and heavy phases.

Another alternative embodiment of the apparatus is possible in which the hollow elements 15 (FIG. 9) are connected (through the distribution pipe 22 to the pipe 19 for feeding the light phase L and to the pipe 20 for feeding the heavy phase S. This modification is preferable in the case of using a mixture of phases of the "oil-in-water" type which is easily separable.)

One specific feature of operation of this modification of the proposed apparatus resides in that both light and heavy phases L and S are conveyed jointly to the hollow elements 15. Formation of a mixture of phases starts as early as in the distribution pipe 22, whereas the mixture of phases M is ejected from the holes 16 of the hollow elements 15 under the action of a pressure head. Therewith, the magnitude of clearance between the base of the hollow elements 15 and first partition 8 can be half the height of the layer of emulsion being formed.

Figure 8:
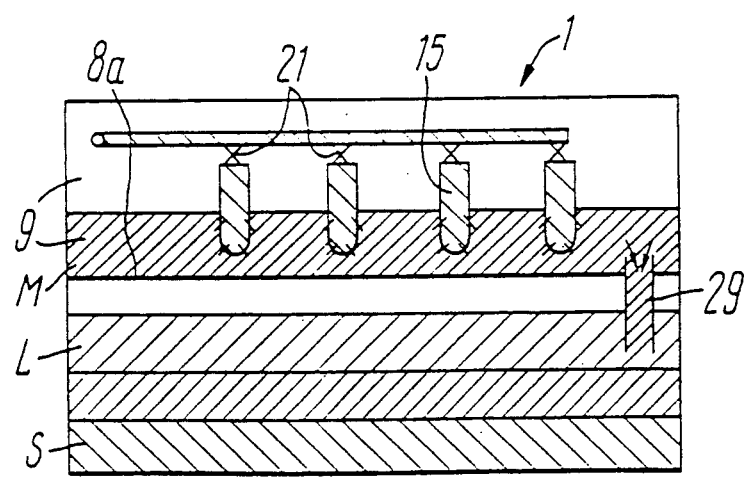
FIG. 8 is a section along line VIII—VIII in FIG. 7.
Figure 10:
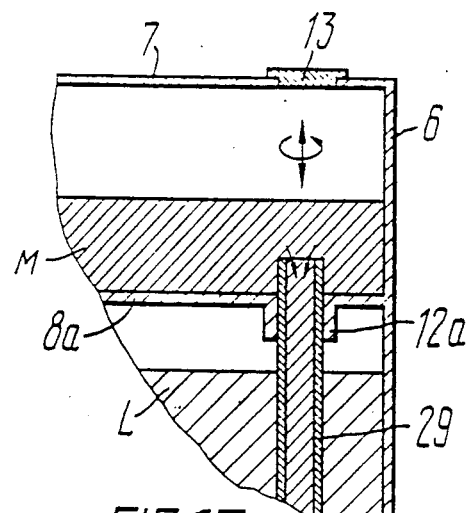
FIG. 10 is a partial section of the pipe in FIG. 8.

The invention envisages a modification of the means for controlling the height of the layer of mixture of phases in the form of one or more pipes 29 (FIGS. 8 and 10).

In this modification the first partition 8a is secured in the casing 2 about its perimeter, whereas the mixing and settling zones 9 and 10 communicate without the pipes 29. The pipes 29 are arranged in the partition 8a for movement in the vertical plane to form a screw joint with the guides 12a. Rotation of the pipes 29 is executed through the lid in the top wall 7 of the casing 2. The inner diameter of the pipes 29 is selected proceeding from the capacity of the apparatus, required time of contact between phases, and conditions for recirculation of phases in the mixing zone.

Most advantageously this invention can be used for separating rare-earth elements, and non-ferrous metals, as well as for extracting ferric chloride from hydrochloric acid pickling solutions in metallurgy.

We claim:

1. A mixer-settler for liquid-liquid extraction having extraction chambers, each extraction chamber having a casing accommodating a first partition diving an interior of the casing into a mixing zone having arranged therein mixing means and means for conveying light and heavy phases L and S attached to the casing, and a settling zone communicating with the mixing zone and accommodating means for evacuating the light phase (L) comprising a discharge weir attached to the casing, and a means for evacuating the heavy phase (S) comprising a hydraulic seal and a first transporting means communicating therewith, the first partition being disposed lengthwise of a longitudinal axis of the casing above the discharge weir, the mixing means comprising at least one hollow element with walls thereof having holes and outlets, the outlets facing the first partition mounted substantially perpendicularly to the longitudinal axis of the casing and connected to at least the feeding means of one of the phases, the first partition being provided with a means for controlling the height of the layer of mixture (M) of phases in the mixing zone mounted on this partition at a location longitudinally remote from the means for feeding the phases (L, S) whereas the settling zone is provided with a second transporting means secured to the casing and positioned after the discharge weir downstream of the flow of the light phase (L).

2. A mixer-settler for liquid-liquid extraction as claimed in claim 1, in which each hollow element is spaced lengthwise of the longitudinal axis of the casing from an adjacent hollow element a certain distance, whereas transversely each hollow element forms a gap with a side wall of the casing so that for each two adjacent elements these gaps rest at opposite sides of the longitudinal axis.

3. A mixer-settler for liquid-liquid extraction as claimed in claims 1, or 2, in which the means for controlling the height of the layer of mixture (M) of phases in the mixing zone comprises a second partition, arranged across a width of the first partition and movable in a vertical plane.

4. A mixer-settler for liquid-liquid extraction as claimed in claim 1 or 2, in which the means for controlling the height of the layer of mixture (M) of phases comprises at least one pipe movable in a vertical plane, the first partition being secured in the casing about a perimeter of the casing.

* * * * *